US012759104B2

(12) United States Patent
Hayashi

(10) Patent No.: US 12,759,104 B2
(45) Date of Patent: Oct. 13, 2026

(54) MACHINE TOOL AND CONTROL DEVICE FOR MACHINE TOOL

(71) Applicants: CITIZEN WATCH CO., LTD., Tokyo (JP); CITIZEN MACHINERY CO., LTD., Nagano (JP)

(72) Inventor: Erisha Hayashi, Nagano (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 241 days.

(21) Appl. No.: 18/839,593

(22) PCT Filed: Jan. 26, 2023

(86) PCT No.: PCT/JP2023/002415
§ 371 (c)(1),
(2) Date: Aug. 19, 2024

(87) PCT Pub. No.: WO2023/181625
PCT Pub. Date: Sep. 28, 2023

(65) Prior Publication Data

US 2025/0196282 A1 Jun. 19, 2025

(30) Foreign Application Priority Data

Mar. 24, 2022 (JP) ................................. 2022-048569

(51) Int. Cl.
*G05B 19/00* (2006.01)
*B23Q 17/09* (2006.01)

(52) U.S. Cl.
CPC ................................ *B23Q 17/0961* (2013.01)

(58) Field of Classification Search
CPC .............. B23Q 17/0961; B23Q 15/007; G05B 2219/43099; G05B 2219/43101; G05B 19/18; G05B 19/416
See application file for complete search history.

(56) References Cited

U.S. PATENT DOCUMENTS 5,825,150 A * 10/1998 Kachi ................ G05B 19/4062 318/610
5,888,037 A * 3/1999 Fujimoto ............. G05B 19/416 408/1 R (Continued)

FOREIGN PATENT DOCUMENTS

EP 0926577 A1 6/1999
JP H04100123 A 4/1992

(Continued)

OTHER PUBLICATIONS

International Search Report issued in corresponding International Application No. PCT/JP2023/002415 mailed Apr. 18, 2023 (5 pages).

(Continued)

*Primary Examiner* — Aleksey Olshannikov
(74) *Attorney, Agent, or Firm* — Osha Bergman Watanabe & Burton LLP

(57) ABSTRACT

A machine tool includes a driver that drives a main spindle for holding a workpiece rotatably, a servo motor that drives a tool for machining the workpiece held on the main spindle, a power source that supplies electric power to at least the driver and the servo motor, a current detector that detects a current value to be inputted into the servo motor, a storage that stores an upper limit of the current value to be inputted into the servo motor, and a controller that controls the servo motor to execute driving control of the tool. When a current value detected by the current detector exceeds the upper limit of the current value immediately after starting the main spindle, the controller changes an acceleration/deceleration time constant from a first time constant to a second time constant that is lower in power consumption than the first time constant, thereby controlling the servo motor.

4 Claims, 5 Drawing Sheets

(56) References Cited

U.S. PATENT DOCUMENTS

| | | | | |
|---|---|---|---|---|
| 9,904,272 | B2 | 2/2018 | Noda et al. | |
| 2002/0138171 | A1* | 9/2002 | Fukutani | B23Q 15/12 700/188 |
| 2007/0132421 | A1* | 6/2007 | Iwashita | H02P 21/16 318/650 |
| 2010/0264867 | A1* | 10/2010 | Iwashita | G05B 19/416 318/635 |
| 2012/0206080 | A1* | 8/2012 | Tezuka | H02J 3/12 318/434 |
| 2016/0239017 | A1* | 8/2016 | Noda | G05B 19/406 |
| 2019/0052216 | A1* | 2/2019 | Tanaka | G05B 19/406 |
| 2022/0214664 | A1* | 7/2022 | Lin | B23Q 17/0961 |

FOREIGN PATENT DOCUMENTS

| | | | |
|---|---|---|---|
| JP | 3252114 | B2 | 1/2002 |
| JP | 2002046042 | A | 2/2002 |
| JP | 2004074357 | A | 3/2004 |
| JP | 5149410 | B2 | 2/2013 |

OTHER PUBLICATIONS

Written Opinion issued in corresponding International Application No. PCT/JP2023/002415 mailed Apr. 18, 2023 (5 pages).

International Preliminary Report on Patentability issued in corresponding International Application No. PCT/JP2023/002415 mailed Apr. 18, 2023 (8 pages).

Extended European Search Report issued in corresponding European Application No. 23774225.9, dated Feb. 23, 2026 (8 pages).

* cited by examiner

MACHINE TOOL AND CONTROL DEVICE FOR MACHINE TOOL

FIELD

The present disclosure relates to a machine tool and a control device for a machine tool.

BACKGROUND

A machine tool including a main spindle for supporting a workpiece rotatably and a tool for machining the workpiece is generally known. A tool driving mechanism of a machine tool is provided with a servo motor, and a tool of the machine tool can be operated by inputting a predetermined current into the servo motor.

A decrease in power source voltage of a machine tool causes an alarm of excessive error indicating that the actual position of the servo motor differs from a position command value.

In Japanese Patent No. 3252114, stable operation of an electric motor is achieved by executing control to increase or decrease an acceleration/deceleration time constant for adjusting reactivity of acceleration or deceleration of the electric motor, depending on variations in input voltage. In Japanese Patent No. 5149410, a limit value of output of a motor that does not adversely affect driving of the motor is calculated based on the voltage of an alternating-current power supply inputted into the motor, and a control parameter for this limitation, which is an acceleration/deceleration time constant or a feed speed override, is determined.

SUMMARY

Variations in power source voltage of a machine tool often result from a driver that drives a main spindle, which consumes the most electric power, and are likely to occur, in particular, at the start of the driver that drives a main spindle. However, control of the acceleration/deceleration time constant of a tool-driving servo motor depending on control of the driver that drives a main spindle is not executed.

An object of the present disclosure is to provide a machine tool and a control device for a machine tool that can easily avoid issuance of an alarm of excessive error by referring to the state of a driver that drives a main spindle.

A machine tool according to an embodiment of the present disclosure includes a driver that drives a main spindle for holding a workpiece rotatably, a servo motor that drives a tool for machining the workpiece held on the main spindle, a power source that supplies electric power to at least the driver and the servo motor, a current detector that detects a current value to be inputted into the servo motor, a storage that stores an upper limit of the current value to be inputted into the servo motor, and a controller that controls the servo motor to execute driving control of the tool. When a current value detected by the current detector exceeds the upper limit of the current value immediately after starting the main spindle, the controller changes an acceleration/deceleration time constant from a first time constant to a second time constant that is lower in power consumption than the first time constant, thereby controlling the servo motor.

The machine tool according to an embodiment of the present disclosure preferably further includes a voltage detector that detects a source voltage value inputted from the power source. When the current value detected by the current detector is equal to or less than the upper limit of the current value and the source voltage value detected by the voltage detector is equal to or less than a threshold voltage value immediately after starting the main spindle, the controller preferably changes the acceleration/deceleration time constant from the first time constant to a third time constant that is lower in power consumption than the first time constant and higher in power consumption than the second time constant, thereby controlling the servo motor.

A control device for a machine tool according to an embodiment of the present disclosure is a control device for a machine tool including a driver that drives a main spindle for holding a workpiece rotatably, a servo motor that drives a tool for machining the workpiece held on the main spindle, and a power source that supplies electric power to at least the driver and the servo motor. The control device includes a current detector that detects a current value to be inputted into the servo motor, a storage that stores an upper limit of the current value to be inputted into the servo motor, and a controller that controls the servo motor to execute driving control of the tool. When a current value detected by the current detector exceeds the upper limit of the current value immediately after starting the main spindle, the controller changes an acceleration/deceleration time constant from a first time constant to a second time constant that is lower in power consumption than the first time constant, thereby controlling the servo motor.

The control device for a machine tool according to an embodiment of the present disclosure preferably further includes a voltage detector that detects a source voltage value inputted from the power source. When the current value detected by the current detector is equal to or less than the upper limit of the current value and the source voltage value detected by the voltage detector is equal to or less than a threshold voltage value immediately after starting the main spindle, the controller preferably changes the acceleration/deceleration time constant from the first time constant to a third time constant that is lower in power consumption than the first time constant and higher in power consumption than the second time constant, thereby controlling the servo motor.

A machine tool and a control device for a machine tool that can easily avoid issuance of an alarm of excessive error by referring to the state of a driver that drives a main spindle are provided according to an embodiment of the present disclosure.

DESCRIPTION OF EMBODIMENTS

A machine tool according to the present embodiment will now be described with reference to the attached drawings. However, note that the technical scope of the present disclosure is not limited to embodiments thereof and covers the invention described in the claims and equivalents thereof.

Figure 1:
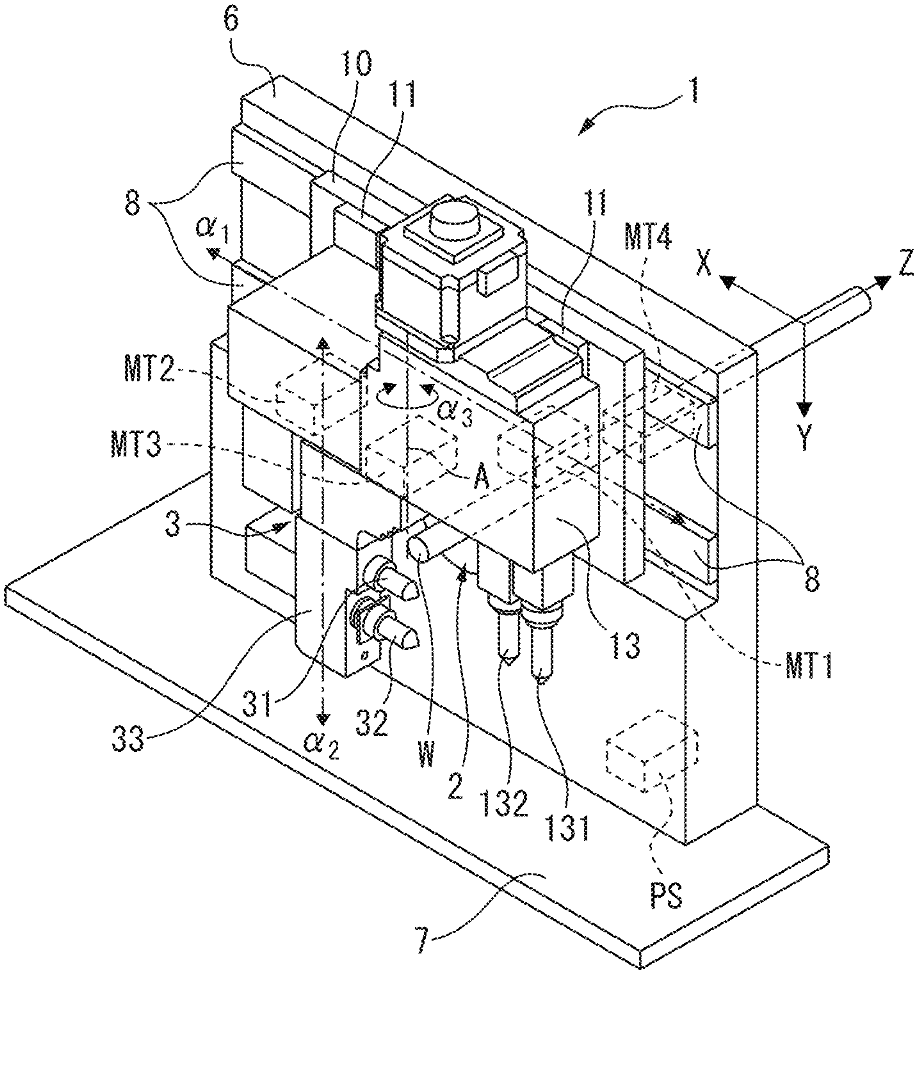
FIG. 1 is a partial perspective view of a machine tool according to the embodiment.

FIG. 1 is a partial perspective view of a machine tool 1 according to the present embodiment. The machine tool 1 shown in FIG. 1 is a device for machining a workpiece W that is a long round bar. The machine tool 1 includes a main spindle 2 for supporting the workpiece W rotatably, a rotary tool driver 13 including a B-axis rotary tool device 3, and a numerically controlled (NC) device 5, which will be described below.

The main spindle 2 is provided on a support 6. The main spindle 2, whose axis is in the Z-axis direction, holds the workpiece W rotatably about the Z-axis, and can move the workpiece W toward the front side of the support 6 by motive power generated by a main-spindle motor (fourth servo motor) MT4 constituting a driver DU. The support 6 is fixed and supported by a bed 7.

On the front side of the support 6 are installed rails 8 extending along the X-axis direction (also referred to as the horizontal direction) perpendicular to the Z-axis direction. On the rails 8 is mounted a base 10 that slides in the direction of arrow $\alpha_1$ by motive power generated by a first servo motor MT1. On the base 10 are installed rails 11 extending along the Y-axis direction (also referred to as the vertical direction) perpendicular to the Z-axis and X-axis directions. On the rails 11 is mounted the rotary tool driver 13 that slides in the direction of arrow $\alpha_2$ by motive power generated by a second servo motor MT2.

The rotary tool driver 13 holds tools for machining the workpiece W. The rotary tool driver 13 includes tools 131 and 132 as well as the B-axis rotary tool device 3 including a first tool 31 and a second tool 32. The tools 131 and 132 are installed side by side along the X-axis direction with their tips facing downward. The first tool 31 and the second tool 32 are rotatably held by a B-axis rotary tool body 33 constituting the B-axis rotary tool device 3, and are installed side by side along the X-axis direction with their tips facing sideward. The machine tool 1 according to the present embodiment can machine the workpiece W with a predetermined tool by moving the workpiece W in the Z-axis direction with the main spindle 2 and moving the rotary tool driver 13 in the direction of arrow $\alpha_1$ or $\alpha_2$. The B-axis rotary tool body 33 is supported so as to be capable of turning in the direction of arrow $\alpha_3$ around a pivot A of a turning motor (third servo motor) MT3 by motive power generated by the turning motor MT3.

The servo motors MT1 to MT4 provided in the machine tool 1 run by electric power supplied from a power source PS. The power source PS converts electric power supplied from a home or commercial power source into electric power usable in the machine tool 1 according to the present embodiment, and supplies the converted electric power at least to the servo motors MT1 to MT4.

Figure 2:
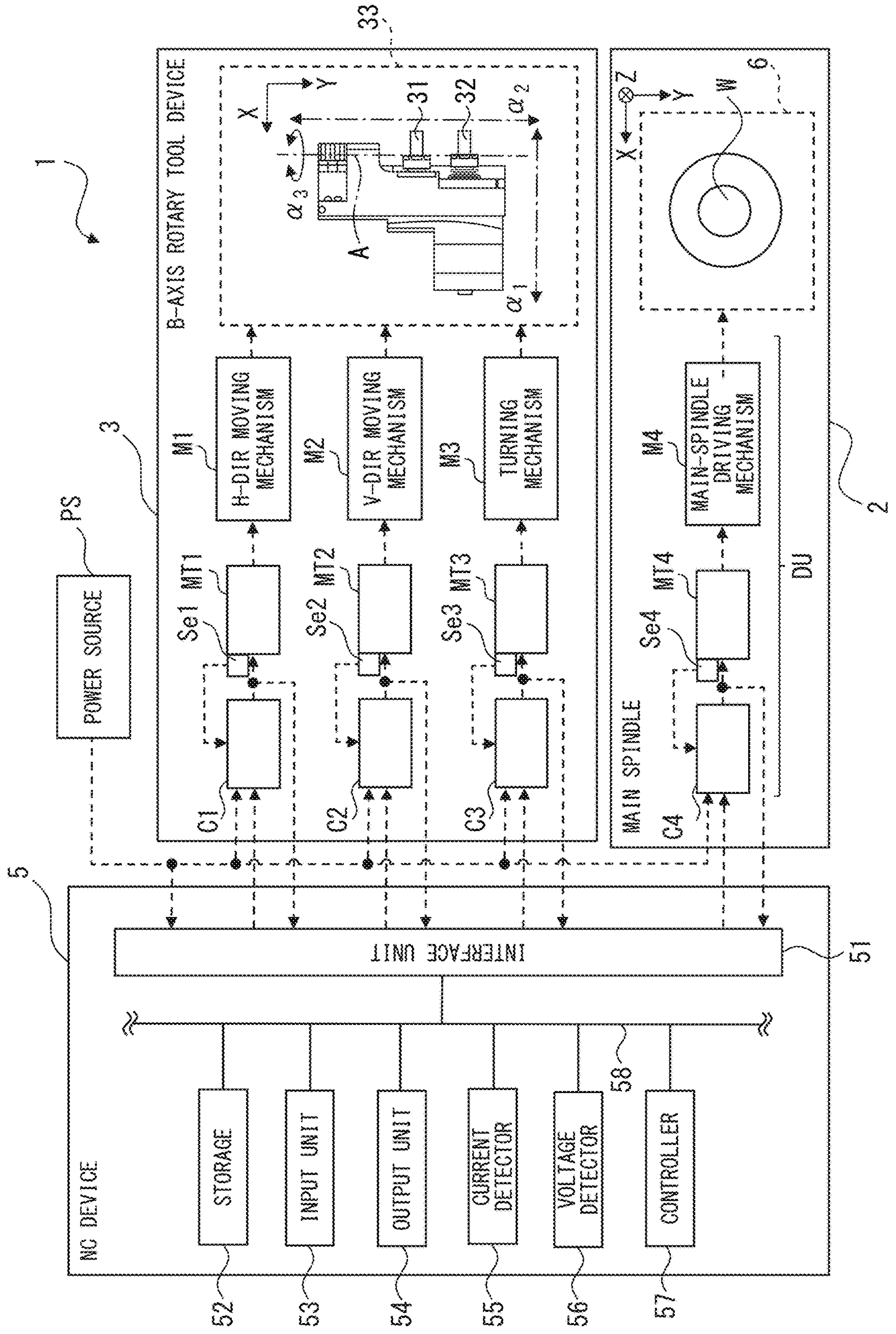
FIG. 2 is a block diagram showing the internal configuration of the machine tool shown in FIG. 1.

FIG. 2 is a block diagram showing the internal configuration of the machine tool 1 shown in FIG. 1. As shown in FIG. 2, the B-axis rotary tool device 3 includes the B-axis rotary tool body 33, a horizontal-direction moving mechanism M1, the first servo motor MT1, a vertical-direction moving mechanism M2, the second servo motor MT2, a turning mechanism M3, and the turning motor MT3.

The horizontal-direction moving mechanism M1 enables the whole rotary tool driver 13 including the B-axis rotary tool body 33 to move in the direction of arrow $\alpha_1$. The first servo motor MT1 converts an inputted current into mechanical output (motive power such as torque and rpm), and gives the output to the horizontal-direction moving mechanism M1. In this way, the horizontal-direction moving mechanism M1 moves the B-axis rotary tool body 33 forward and backward in the direction of arrow $\alpha_1$. Operation of the first servo motor MT1 is controlled by a motion controller C1.

The motion controller C1 is supplied with electric power by the power source PS to input a predetermined current into the first servo motor MT1, depending on a control signal transmitted from the NC device 5 described below. A control signal transmitted to the motion controller C1 includes at least the amount of rotation (radian or the number of steps) and the number of revolutions (rpm) of the first servo motor MT1. The first servo motor MT1 is provided with a sensor Se1, which detects the actual amount of rotation and the actual number of revolutions of the first servo motor MT1 and transmits them to the motion controller C1. The motion controller C1 compares the values of the amount of rotation and the number of revolutions of the first servo motor MT1 included in a control signal with the values of the actual amount of rotation and the actual number of revolutions of the first servo motor MT1 detected by the sensor Se1, and inputs a predetermined current into the first servo motor MT1 so as to reduce the differences between these values to zero. Since the methods of controlling motion controllers C2 to C4 are similar to that of controlling the motion controller C1, a detailed description thereof is omitted.

The vertical-direction moving mechanism M2 enables the whole rotary tool driver 13 including the B-axis rotary tool body 33 to move upward and downward in the direction of arrow $\alpha_2$. The second servo motor MT2 generates motive power for operating the vertical-direction moving mechanism M2. Operation of the second servo motor MT2 is controlled by the motion controller C2. Since the method of the motion controller C2 controlling the second servo motor MT2 is similar to that of the motion controller C1 controlling the first servo motor MT1, a detailed description thereof is omitted.

The turning mechanism M3 enables the B-axis rotary tool body 33 to turn in the direction of arrow $\alpha_3$ around the pivot A of the turning motor MT3. The turning motor MT3 generates motive power for operating the turning mechanism M3. Operation of the turning motor MT3 is controlled by the motion controller C3. Since the method of the motion controller C3 controlling the turning motor MT3 is similar to that of the motion controller C1 controlling the first servo motor MT1, a detailed description thereof is omitted.

As shown in FIG. 2, the main spindle 2 includes a main-spindle driving mechanism M4 and the main-spindle motor MT4 that constitute the driver DU. The main-spindle driving mechanism M4, whose axis is in the Z-axis direction, supports the workpiece W rotatably about the Z-axis, and can move the workpiece W toward the front side of the support 6 by motive power generated by the main-spindle motor MT4. The main-spindle motor MT4 generates motive power for operating the main-spindle driving mechanism M4. Operation of the main-spindle motor MT4 is controlled by the motion controller C4. Since the method of the motion controller C4 controlling the main-spindle motor MT4 is similar to that of the motion controller C1 controlling the first servo motor MT1, a detailed description thereof is omitted. The main-spindle motor MT4 may be any motor rotating stably other than a servo motor.

The NC device 5 controls operation of the main spindle 2 and the B-axis rotary tool device 3. As shown in FIG. 2, the NC device 5 includes an interface unit 51, a storage 52, an input unit 53, an output unit 54, a current detector 55, a voltage detector 56, and a controller 57. The interface unit 51, the storage 52, the input unit 53, the output unit 54, the current detector 55, the voltage detector 56, and the controller 57 are connected to each other via a bus 58. Various control signals from the controller 57 are transmitted to the motion controllers C1 to C5 via the interface unit 51. Current values outputted from the motion controllers C1 to C4 to the corresponding servo motors MT1 to MT4 are transmitted to the current detector 55 via the interface unit 51.

The storage 52 includes, for example, a semiconductor memory, and stores programs and data used for processing by the controller 57. The storage 52 stores at least a program executed by the controller 57 to cause the main spindle 2 and the B-axis rotary tool device 3 to perform a series of workpiece machining steps. The program may be installed on the storage 52 from a computer-readable portable storage medium, such as a CD-ROM, with a known set-up program.

Further, the storage 52 prestores an upper limit of the current values to be inputted into the servo motors MT1 to MT4 from the motion controllers C1 to C4. The upper limit is a current value at which there is a risk of a breakdown of a servo motor.

The input unit 53 may be any known device that enables input of data, and generates a signal corresponding to operation by an operator of the machine tool 1. The generated signal is supplied to the controller 57 as the operator's instruction.

The output unit 54 may be any known device that can display video and images, and displays video and images depending on video data or image data supplied from the controller 57.

The current detector 55 detects current values to be inputted into the servo motors MT1 to MT4 from the motion controllers C1 to C4, and transmits the results of detection to the controller 57. The voltage detector 56 detects a source voltage value inputted from the power source PS into the main spindle 2 and the B-axis rotary tool device 3, and transmits the result of detection to the controller 57.

The controller 57 centrally controls the entire operation of the machine tool 1, and is, for example, a central processing unit (CPU). The controller 57 causes a series of workpiece machining steps to be performed, in accordance with a program stored in the storage 52. The controller 57 transmits control signals for a series of workpiece machining steps to be performed to the motion controllers C1 to C4 via the interface unit 51, thereby controlling the servo motors MT1 to MT4 to execute driving control of the tools. The control signals include the amounts of rotation (radians or the numbers of steps) and the numbers of revolutions (rpm) of the servo motors.

Figure 3:
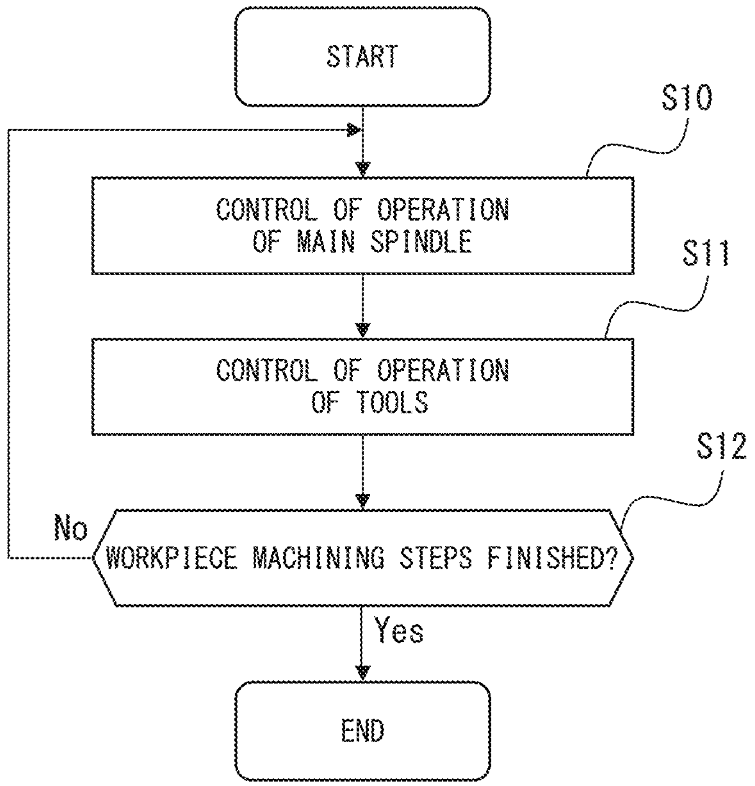
FIG. 3 is a flowchart showing a series of workpiece machining steps performed by the machine tool according to the embodiment.

FIG. 3 is a flowchart showing a series of workpiece machining steps performed by the machine tool 1 according to the present embodiment.

When an instruction to machine a workpiece is inputted by a predetermined procedure, the controller 57 first executes control of operation of the main spindle 2 in accordance with a program stored in the storage 52 (step S10). More specifically, the controller 57 transmits a predetermined control signal including the amount of rotation (radian or the number of steps) and the number of revolutions (rpm) of the main-spindle motor MT4 to the motion controller C4 via the interface unit 51. The motion controller C4 controls the main-spindle motor MT4, depending on the control signal transmitted from the controller 57, to drive the main-spindle driving mechanism M4, thereby rotating the workpiece W about the Z-axis and moving the workpiece W toward the front side of the support 6.

Next, the controller 57 executes control of operation of the tools (step S11). More specifically, the controller 57 controls at least one of the servo motors MT1 and MT2 to move the B-axis rotary tool device 3, thereby moving the B-axis rotary tool body 33 in the direction of arrow $\alpha_1$ or $\alpha_2$. This enables the machine tool 1 according to the present embodiment to push the tools 131 and 132 as well as the first tool 31 and the second tool 32 against the rotating workpiece W to machine the workpiece W.

Finally, the controller 57 determines whether the series of workpiece machining steps is finished (step S12). When the workpiece machining steps are not finished (No in step S12), the process returns to step S10. When the series of workpiece machining steps is finished (Yes in step S12), the series of workpiece machining steps is finished.

Figure 4:
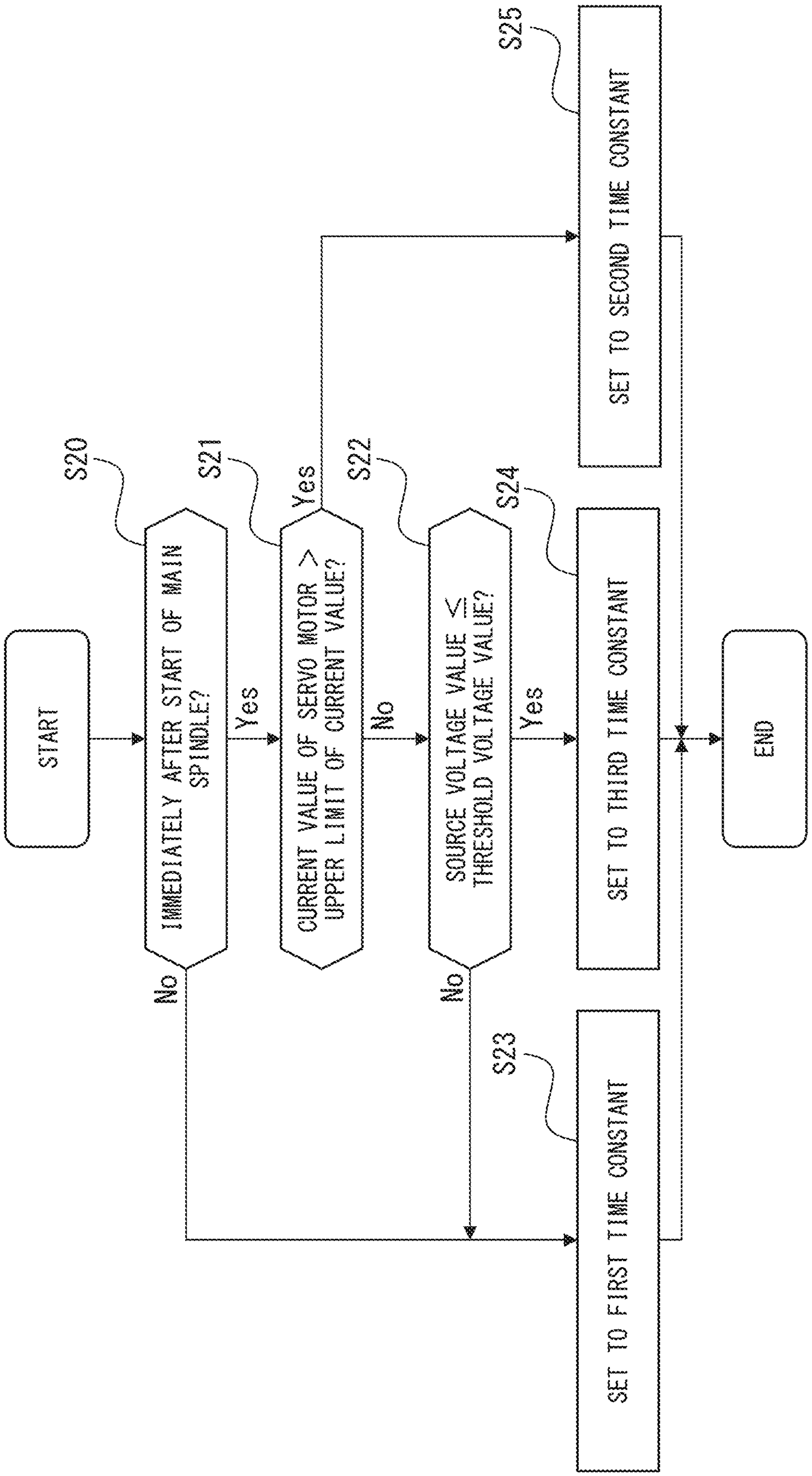
FIG. 4 is a flowchart showing a process of determining the time constant of a servo motor in the series of workpiece machining steps shown in FIG. 3.

FIG. 4 is a flowchart showing a process of determining the time constant of the second servo motor MT2 in the series of workpiece machining steps shown in FIG. 3. The process shown in FIG. 4 is executed at regular intervals in the series of workpiece machining steps shown in FIG. 3. FIG. 4 illustrates a process on the second servo motor MT2 as an example, but similar processes may also be executed on the other servo motors MT1 and MT3.

First, the controller 57 determines whether the current time is immediately after the start of the main spindle 2 (step S20). In the present embodiment, the time immediately after the start of the main spindle 2 refers to a period from input into the motion controller C4 of a control signal to start the main spindle 2 rotating until the main spindle 2 starts operating at its rating. When the current time is not immediately after the start of the main spindle 2 (No in step S20), the controller sets the acceleration/deceleration time constant to a first time constant (step S23) and terminates the process.

When the current time is immediately after the start of the main spindle 2 (Yes in step S20), the controller 57 determines whether the current value supplied to the second servo motor MT2 detected by the current detector 55 exceeds the upper limit of the current value stored in the storage 52 (step S21). When the current value of the second servo motor MT2 exceeds the upper limit of the current value (Yes in step S21), there is a risk of a breakdown of the second servo motor MT2. Thus the controller 57 sets the acceleration/deceleration time constant to a second time constant (step S25) and terminates the process.

Next, When the current value of the second servo motor MT2 does not exceed the upper limit of the current value (No in step S21), the controller 57 determines whether the source voltage value of the power source PS detected by the voltage detector 56 is equal to or less than a threshold voltage value (i.e., whether a voltage drop has occurred in the power source PS) (step S22). When the source voltage value of the power source PS exceeds the threshold voltage value (No in step S22), there is no risk of a breakdown of the second servo motor MT2, and a voltage drop has not occurred in the power source PS. Thus the controller 57 sets the acceleration/deceleration time constant to the first time constant (step S23) and terminates the process.

Next, when the source voltage value of the power source PS is equal to or less than the threshold voltage value (Yes in step S22), there is no risk of a breakdown of the second servo motor MT2, but a voltage drop has occurred in the power source PS. Thus the controller 57 sets the acceleration/deceleration time constant to a third time constant (step S24) and terminates the process.

The acceleration/deceleration time constant is a value corresponding to the time until the rotation speed of the servo motor reaches a set rotation speed. The first time constant corresponds to the shortest time until the rotation speed of the second servo motor MT2 reaches the set rotation speed during normal operation. At the second time constant, the time until the rotation speed of the second servo motor MT2 reaches the set rotation speed is longer than at the first time constant, and thus the power consumption per unit time of the second servo motor MT2 is lower than at the first time constant. At the third time constant, the time until the rotation speed of the second servo motor MT2 reaches the set rotation speed is longer than at the first time constant and shorter than at the second time constant, and thus the power consumption per unit time of the second servo motor MT2 is lower than at the first time constant and higher than at the second time constant.

By the process flow shown in FIG. 4, the time constant of the second servo motor MT2 is set to the first time constant except immediately after the start of the main spindle 2, and to one of the first to third time constants immediately after the start of the main spindle 2, depending on the current value of the second servo motor MT2 and the source voltage value.

Figure 5:
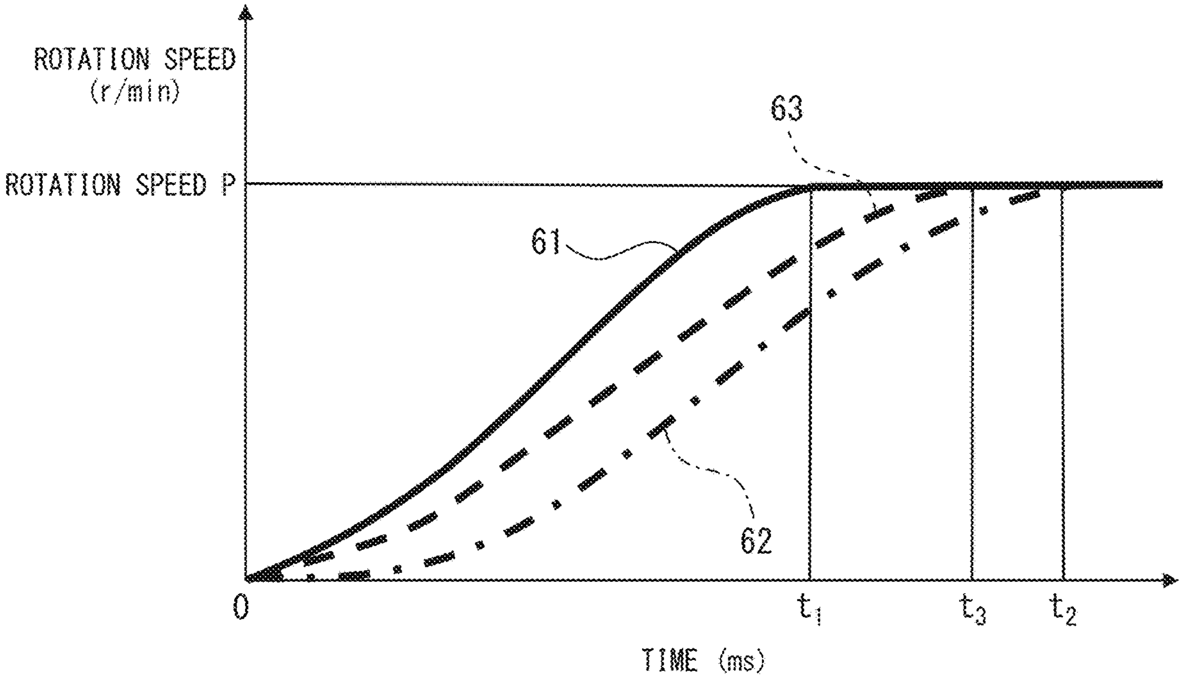
FIG. 5 is a waveform chart showing examples of time-varying changes in the rotation speed of a servo motor that depend on the current value control shown in FIG. 4.

FIG. 5 is a waveform chart showing examples of time-varying changes in the rotation speed of the second servo motor MT2 that depend on the current value control shown in FIG. 4. In FIG. 4, the abscissa represents time (time $t_1$ to $t_3$) (ms), and the ordinate represents the rotation speed (r/min) of the servo motor.

When controlling the second servo motor MT2 in the series of workpiece machining steps shown in FIG. 3, the controller 57 generates a control signal based on the time constant that is currently set, and transmits the signal to the motion controller C2. The motion controller C2 adjusts the current value to be inputted into the second servo motor MT2, depending on the transmitted control signal. This enables the machine tool 1 according to the present embodiment to operate the second servo motor MT2, regardless of variations in the inputted voltage value and the source voltage value.

The solid line 61 in FIG. 5 indicates time-varying changes in the rotation speed of the second servo motor MT2 corresponding to the first time constant. When the first time constant is set, for example, it is $t_1$=70 ms from the start of operation that the rotation speed reaches P (r/min). The dashed and dotted line 62 in FIG. 5 indicates time-varying changes in the rotation speed of the second servo motor MT2 corresponding to the second time constant. For example, it is $t_2$=100 ms from the start of operation that the rotation speed reaches P (r/min). The dashed line 63 in FIG. 5 indicates time-varying changes in the rotation speed of the second servo motor MT2 corresponding to the third time constant. When the third time constant is set, for example, it is $t_3$=90 ms from the start of operation that the rotation speed reaches P (r/min).

When the second time constant is set, the number of revolutions of the second servo motor MT2 need not be increased as rapidly as when the first time constant is set, and thus the supplied current value will not exceed the upper limit of the current value. As a result, when the second time constant is set, the possibility of a breakdown of the second servo motor MT2 and issuance of an alarm of excessive error is lower than when the first time constant is set. Similarly, when the third time constant is set, the number of revolutions of the second servo motor MT2 can be increased slower than when the first time constant is set, and thus the supplied current value will not exceed the upper limit of the current value. As a result, when the third time constant is set, the possibility of a breakdown of the second servo motor MT2 and issuance of an alarm of excessive error is much lower than when the first time constant is set.

In the machine tool 1 according to the present embodiment, the second servo motor MT2 is taken as an example, but the same holds true for the other servo motors MT1 and MT3.

In the machine tool 1 according to the present embodiment, three time constants are used as the acceleration/deceleration time constant, but one of two or four or more time constants may be set depending on parameters such as the current value of a servo motor and the source voltage value of the power source PS.

In the machine tool 1 according to the present embodiment, the servo motors MT1 to MT4 that operate the main spindle 2 and the B-axis rotary tool device 3 have been mainly described, but the above-described control is also applicable to another servo motor that differs from those described above, such as one that drives a tool.

While the embodiment has been described above, all the examples and conditions herein have been described for the purpose of helping to understand the invention and the concepts thereof to be applied to a technique. In particular, the described examples and conditions are not intended to limit the scope of the invention, and the configurations of such examples in the description do not illustrate the advantages or disadvantages of the invention. Although the embodiment of the invention has been described in detail, it should be understood that various changes, substitutions, and modifications can be made without departing from the spirit and scope of the invention.

The invention claimed is:

1. A machine tool comprising:

a driver that drives a main spindle for holding a workpiece rotatably;

a servo motor that drives a tool for machining the workpiece held on the main spindle;

a power source that supplies electric power to at least the driver and the servo motor;

a current detector that detects a current value to be inputted into the servo motor;

a storage that stores an upper limit of the current value to be inputted into the servo motor; and a controller that controls the servo motor to execute driving control of the tool, wherein when a current value detected by the current detector exceeds the upper limit of the current value immediately after starting the main spindle, the controller changes an acceleration/deceleration time constant from a first time constant to a second time constant that is lower in power consumption than the first time constant, thereby controlling the servo motor.

2. The machine tool according to claim 1, further comprising a voltage detector that detects a source voltage value inputted from the power source, wherein when the current value detected by the current detector is equal to or less than the upper limit of the current value and the source voltage value detected by the voltage detector is equal to or less than a threshold voltage value immediately after starting the main spindle, the controller changes the acceleration/deceleration time constant from the first time constant to a third time constant that is lower in power consumption than the first time constant and higher in power consumption than the second time constant, thereby controlling the servo motor.

3. A control device for a machine tool including a driver that drives a main spindle for holding a workpiece rotatably, a servo motor that drives a tool for machining the workpiece held on the main spindle, and a power source that supplies electric power to at least the driver and the servo motor, the control device comprising:

a current detector that detects a current value to be inputted into the servo motor;

a storage that stores an upper limit of the current value to be inputted into the servo motor; and a controller that controls the servo motor to execute driving control of the tool, wherein when a current value detected by the current detector exceeds the upper limit of the current value immediately after starting the main spindle, the controller changes an acceleration/deceleration time constant from a first time constant to a second time constant that is lower in power consumption than the first time constant, thereby controlling the servo motor.

4. The control device for a machine tool according to claim 3, further comprising a voltage detector that detects a source voltage value inputted from the power source, wherein when the current value detected by the current detector is equal to or less than the upper limit of the current value and the source voltage value detected by the voltage detector is equal to or less than a threshold voltage value immediately after starting the main spindle, the controller changes the acceleration/deceleration time constant from the first time constant to a third time constant that is lower in power consumption than the first time constant and higher in power consumption than the second time constant, thereby controlling the servo motor.

* * * * *